(12) United States Patent
Xiao et al.

(10) Patent No.: US 8,374,268 B2
(45) Date of Patent: *Feb. 12, 2013

(54) METHOD AND APPARATUS FOR PROVIDING CHANNEL QUALITY FEEDBACK IN AN ORTHOGONAL FREQUENCY DIVISION MULTIPLEXING COMMUNICATION SYSTEM

(75) Inventors: Weimin Xiao, Barrington, IL (US); Amitava Ghosh, Buffalo Grove, IL (US); Rapeepat Ratasuk, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,447

(22) Filed: Nov. 7, 2011

(65) Prior Publication Data

US 2012/0051413 A1 Mar. 1, 2012

Related U.S. Application Data

(63) Continuation of application No. 11/552,716, filed on Oct. 25, 2006, now Pat. No. 8,054,894.

(60) Provisional application No. 60/731,976, filed on Oct. 31, 2005.

(51) Int. Cl.
*H04K 1/10* (2006.01)
*H04L 27/28* (2006.01)

(52) U.S. Cl. ......... 375/260; 375/358; 375/341; 375/347

(58) Field of Classification Search ................. 375/260, 375/262, 265, 333, 340, 224, 341
See application file for complete search history.

(56) References Cited

U.S. PATENT DOCUMENTS

| | | | |
|---|---|---|---|
| 6,043,771 A * | 3/2000 | Clark et al. | 342/13 |
| 6,091,777 A | 7/2000 | Guetz et al. | |
| 6,215,827 B1 | 4/2001 | Balachandran et al. | |
| 6,317,409 B1 * | 11/2001 | Murakami | 370/203 |

(Continued)

FOREIGN PATENT DOCUMENTS

| | | |
|---|---|---|
| EP | 1533966 A2 | 5/2005 |
| JP | 2003169036 | 6/2003 |

(Continued)

OTHER PUBLICATIONS

Kolding, T.E. et al.: "Low-Bandwidth Channel Quality Indication ofr OFDMA Frequency Domain Packet Scheduling", Wireless Communication Systems, 2006., ISWCS '06. 3rd International Symposium on Wireless Communication Systems, Sep. 6-8, 2006, pp. 282.

(Continued)

*Primary Examiner* — Daniel Washburn
*Assistant Examiner* — Qutbuddin Ghulamali

(57) ABSTRACT

In an Orthogonal Frequency Division Multiplexing communication system, a user equipment reports channel quality information that is sufficient to construct a fading profile of a frequency bandwidth and that does not consuming the overhead resulting from the reporting of CQI for every sub-band of the frequency bandwidth. In the communication system, the frequency bandwidth may be represented by multiple sub-band levels, wherein each sub-band level comprises a division of the frequency bandwidth into a number of sub-bands different from the number of sub-bands of the other sub-band levels. The user equipment measures a channel quality associated with each sub-band of a sub-band level of the multiple sub-band levels, selects a sub-band of the sub-band level based on the measured channel qualities, and reports channel quality information associated with the selected sub-band to a radio access network.

4 Claims, 5 Drawing Sheets

U.S. PATENT DOCUMENTS

| | | |
|---|---|---|
| 7,640,373 B2 | 12/2009 | Cudak et al. |
| 2004/0248618 A1 | 12/2004 | Yoshii et al. |
| 2004/0264507 A1 | 12/2004 | Cho et al. |
| 2005/0025039 A1 | 2/2005 | Hwang et al. |
| 2005/0201474 A1 | 9/2005 | Cho et al. |
| 2005/0238108 A1 | 10/2005 | Suh et al. |
| 2006/0146760 A1* | 7/2006 | Khandekar et al. ........... 370/335 |
| 2006/0193373 A1 | 8/2006 | Agee et al. |
| 2007/0098097 A1 | 5/2007 | Khan et al. |
| 2007/0217540 A1 | 9/2007 | Onggosanusi et al. |
| 2007/0223611 A1* | 9/2007 | Ode et al. ...................... 375/260 |
| 2007/0242770 A1 | 10/2007 | Kim et al. |
| 2007/0253473 A1 | 11/2007 | Ishii et al. |
| 2008/0013610 A1 | 1/2008 | Varadarajan et al. |
| 2009/0028260 A1 | 1/2009 | Xiao et al. |
| 2010/0144282 A1 | 6/2010 | Laroia et al. |

FOREIGN PATENT DOCUMENTS

| | | |
|---|---|---|
| JP | 2005160079 | 6/2005 |
| WO | 2004066104 A2 | 8/2004 |

OTHER PUBLICATIONS

Pedersen, K.I. et al.: "Frequency Domain Scheduling for OFDMA with Limited and Noisy Channel Feedback", Vehicular Technology Conference, 2007. VTC-2007 Fall, 2007 IEEE 66th Vehicular Technology Conference, Sep. 30-Oct. 3, 2007, pp. 1792-1796.

The State Intellectual Property Office of the People's Republic of China, "Notification of the First Office Action" for Chinese Patent Application No. 200880123147.2 dated Jul. 10, 2012; 11 pages.

Supplementary European Search Report, European Patent Office, Munich, Sep. 5, 2012, all pages.

* cited by examiner

200:

600

700

US 8,374,268 B2

METHOD AND APPARATUS FOR PROVIDING CHANNEL QUALITY FEEDBACK IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 60/731,976, entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," and filed Oct. 31, 2005, and is a continuation application of application Ser. No. 11/552,716, entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," and filed Oct. 25, 2006, which applications are commonly owned and incorporated herein by reference in their entirety.

FIELD OF THE INVENTION

The present invention relates generally to Orthogonal Frequency Division Multiplexing (OFDM) communication systems, and, in particular, to an exchange of channel quality information in an OFDM communication system.

BACKGROUND OF THE INVENTION

The IEEE (Institute of Electrical and Electronics Engineers) 802.16 standards propose using an Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-bands, or subcarriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is minimized.

In order to maximize bandwidth usage, OFDMA communication systems engage in frequency selective scheduling. That is, for any given Transmission Time Interval (TTI), the sub-bands may be allocated to users based on measured channel conditions. Further, an appropriate modulation scheme and coding scheme may be determined for each sub-band and each TTI based on the measured channel conditions. The channel condition measurements are performed by a user equipment (UE), which UE measures channel conditions for each and every sub-band during a measuring period, such as a Transmission Time Interval (TTI) (also known as a sub-frame) or a radio frame transmission period, and then reports the measured channel conditions for all of the sub-bands to a serving Node B in a Channel Quality Information (CQI) message. Based on the reported CQIs, an OFDMA communication system is able to determine a fading profile of a frequency bandwidth and selectively schedule the sub-bands over a scheduling period, typically one or more TTIs or radio frames, and further adaptively determine appropriate modulation and coding schemes for each sub-band during the scheduling period. However, reporting a CQI for each and every sub-band may consume a significant amount of uplink system overhead, especially for OFDMA systems utilizing a 20 megahertz (MHz) bandwidth and employing as many as 100 sub-bands within that bandwidth.

Therefore, a need exists for a method and apparatus that provides channel quality information sufficient to construct a fading profile of a frequency bandwidth and that does not consuming the overhead resulting from the reporting of CQI for every sub-band of the frequency bandwidth.

DETAILED DESCRIPTION OF THE INVENTION

Figure 1:
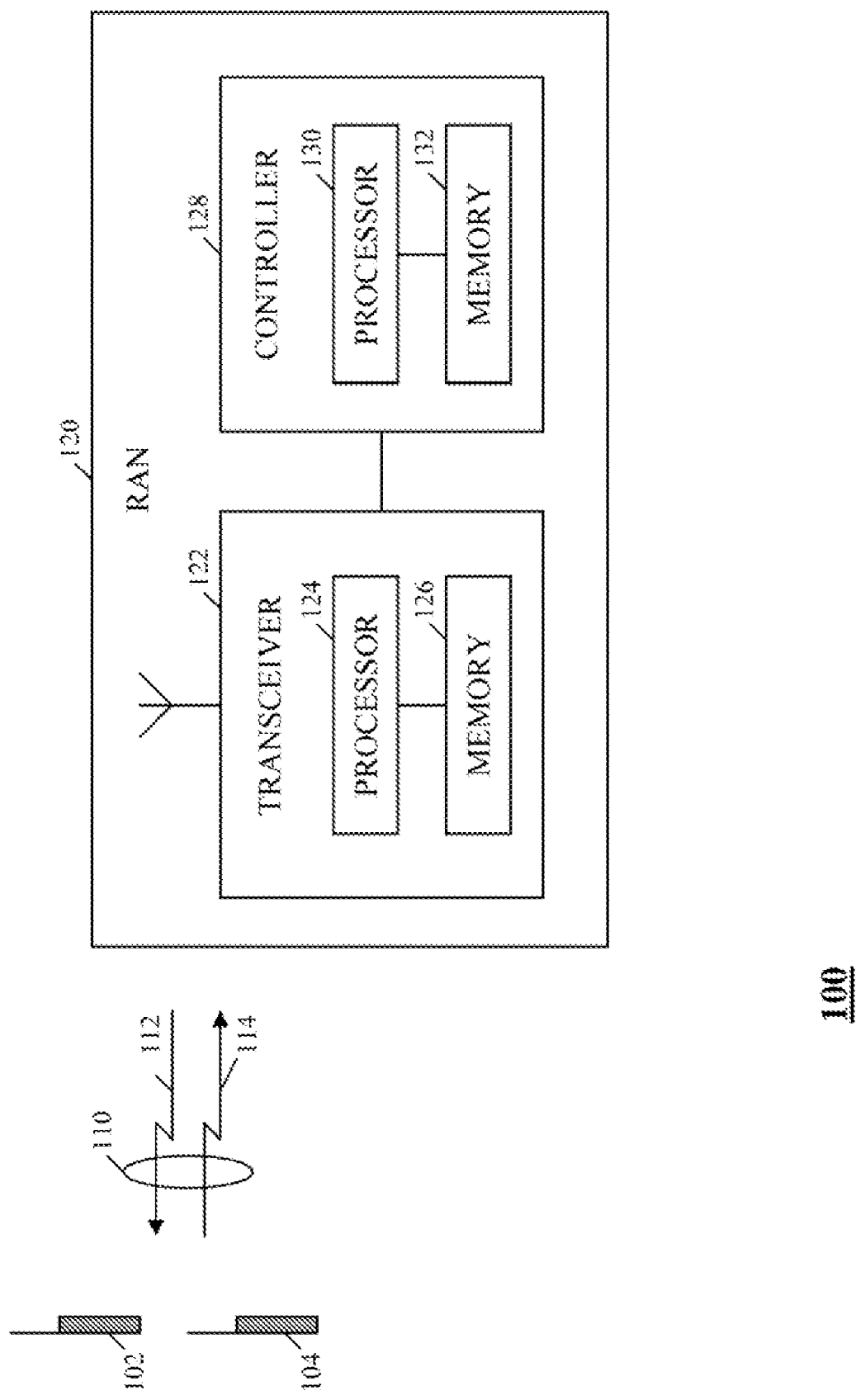
FIG. 1 is a block diagram of a wireless communication system in accordance with an embodiment of the present invention.

To address the need for a method and an apparatus that provides channel quality information that is sufficient to construct a fading profile of a frequency bandwidth and that does not consuming the overhead resulting from the reporting of CQI for every sub-band of the frequency bandwidth, an Orthogonal Frequency Division Multiplexing (OFDM) communication is provided wherein the frequency bandwidth may be represented by multiple sub-band levels and wherein each sub-band level comprises a division of the frequency bandwidth into a number of sub-bands different from the number of sub-bands of the other sub-band levels. The communication system includes user equipment that measures a channel quality associated with each sub-band of a sub-band level of the multiple sub-band levels, selects a sub-band of the sub-band level based on the measured channel qualities, and reports channel quality information associated with the selected sub-band to a radio access network.

Generally, an embodiment of the present invention encompasses a method for providing channel quality feedback in an OFDM communication system, wherein a frequency bandwidth may be represented by multiple sub-band levels and wherein each sub-band level comprises a division of the frequency bandwidth into a number of sub-bands different from the number of sub-bands of the other sub-band levels. The method includes measuring a channel quality associated with each sub-band of a sub-band level of the multiple sub-band levels, selecting a sub-band of the multiple sub-band levels based on the measured channel qualities, and reporting channel quality information associated with the selected sub-band to a radio access network.

Another embodiment of the present invention encompasses a method for providing channel quality feedback in an OFDM communication system, wherein a frequency bandwidth may be represented by multiple sub-band levels, wherein each sub-band level comprises a division of the frequency bandwidth into a number of sub-bands different from the number of sub-bands of the other sub-band levels. The method includes selecting a sub-band level, measuring a channel quality associated with each sub-band of the selected sub-band level, selecting a sub-band of the selected sub-band level based on the measured channel qualities, and reporting channel quality information associated with the selected sub-band to a radio access network.

Yet another embodiment of the present invention encompasses a method for providing channel quality feedback in an OFDM communication system, wherein a frequency bandwidth comprises a single sub-band. The method includes measuring multiple channel qualities associated with the sub-band, averaging the measured channel qualities to produce an average channel quality, and reporting the average channel quality to a radio access network.

Still another embodiment of the present invention encompasses a method for constructing a fading profile for a frequency bandwidth in an OFDM communication system, wherein the frequency bandwidth may be represented by a plurality of sub-band levels, wherein each sub-band level comprises a division of the frequency bandwidth into a number of sub-bands different from the number of sub-bands of the other sub-band levels. The method includes receiving a plurality of messages that each comprises channel quality information for a sub-band of a sub-band level of the plurality of sub-band levels and constructing a fading profile for the frequency bandwidth based on the received messages.

Yet another embodiment of the present invention encompasses a user equipment that is configured to report a channel quality in an OFDM communication system, wherein a frequency bandwidth may be represented by multiple sub-band levels and wherein each sub-band level comprises a division of the frequency bandwidth into a number of sub-bands different from the number of sub-bands of the other sub-band levels. The user equipment comprises a processor that measures a channel quality associated with each sub-band of a sub-band level of the multiple sub-band levels, selects a sub-band of the sub-band level based on the measured channel qualities, and reports channel quality information associated with the selected sub-band to a radio access network.

Still another embodiment of the present invention encompasses a user equipment that is configured to report a channel quality in an OFDM communication system, wherein a frequency bandwidth may be represented by multiple sub-band levels and wherein each sub-band level comprises a division of the frequency bandwidth into a number of sub-bands different from the number of sub-bands of the other sub-band levels. The user equipment comprises a processor that selects a sub-band of the plurality of sub-bands by selecting a sub-band level of the plurality of sub-band levels, measures a channel quality associated with each sub-band of the selected sub-band level, selects a sub-band of the selected sub-band level based on the measured channel qualities, and reports channel quality information associated with the selected sub-band to a radio access network.

Yet another embodiment of the present invention encompasses a user equipment that is configured to report a channel quality in an OFDM communication system, wherein a frequency bandwidth comprises a single sub-band and wherein the user equipment comprises a processor that measures a plurality of channel qualities associated with the sub-band, averages the measured channel qualities to produce an average channel quality, and reports the average channel quality to a radio access network.

Still another embodiment of the present invention encompasses a radio access network that is configured to construct a fading profile for a frequency bandwidth in an OFDM communication system, wherein the frequency bandwidth may be represented by a plurality of sub-band levels, wherein each sub-band level comprises a division of the frequency bandwidth into a number of sub-bands different from the number of sub-bands of the other sub-band levels, and wherein the radio access network receives a plurality of messages that each comprises channel quality information for a sub-band of a sub-band level of the plurality of sub-band levels and constructs a fading profile for the frequency bandwidth based on the received messages.

The present invention may be more fully described with reference to FIGS. 1-8. FIG. 1 is a block diagram of a wireless communication system 100 in accordance with an embodiment of the present invention. Communication system 100 includes multiple user equipment (UEs) 102, 104 (two shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a Radio Access Network (RAN) 120 that provides communication services to each of UEs 102 and 104 via an air interface 110. RAN 120 includes a transceiver 122, such as a Node B or a Base Transceiver Station (BTS), in wireless communication with UE 102 and further includes a network controller 128, such as a Radio Network Controller (RNC) or a Base Station Controller (BSC), coupled to the transceiver. Air interface 110 comprises a downlink 112 and an uplink 114. Each of downlink 112 and uplink 114 comprises multiple physical communication channels, including at least one signaling channel and at least one traffic channel.

Transceiver 122 and controller 128 each includes a respective processor 124, 130, such as one or more microprocessors, microcontrollers, digital signal processors (DSPs), combinations thereof or such other devices known to those having ordinary skill in the art. The particular operations/functions of processors 124 and 130, and respectively thus of transceiver 122 and controller 128, are determined by an execution of software instructions and routines that are stored in a respective at least one memory device 126, 132 associated with the processor, such as random access memory (RAM), dynamic random access memory (DRAM), and/or read only memory (ROM) or equivalents thereof, that store data and programs that may be executed by the corresponding processor.

Figure 2:
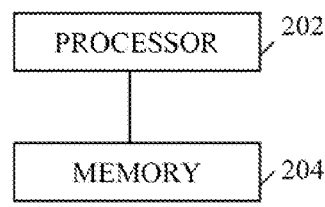
FIG. 2 is a block diagram of a user equipment in accordance with an embodiment of the present invention.

FIG. 2 is a block diagram of a user equipment (UE) 200, such as UEs 102 and 104, in accordance with an embodiment of the present invention. UE 200 includes a processor 202, such as one or more microprocessors, microcontrollers, digital signal processors (DSPs), combinations thereof or such other devices known to those having ordinary skill in the art. The particular operations/functions of processor 202, and respectively thus of UE 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor.

The embodiments of the present invention preferably are implemented within UEs 102 and 104, transceiver 122, and controller 128, and more particularly with or in software programs and instructions stored in the respective at least one memory device 204, 126, 132 and executed by respective processors 202, 124, 130. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 102 and 104, transceiver 122, and controller 128. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Preferably, communication system 100 is an Orthogonal Frequency Division Multiple Access (OFDMA) communication system, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultrawideband (UWB) communication systems.

In order to selectively schedule the multiple UEs 102, 104 for use of one or more sub-bands of a frequency bandwidth employed by communication system 100, RAN 120 provides each UE 102, 104 with scheduling information for a scheduling period. The scheduling information typically includes a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated sub-band.

Figure 3:
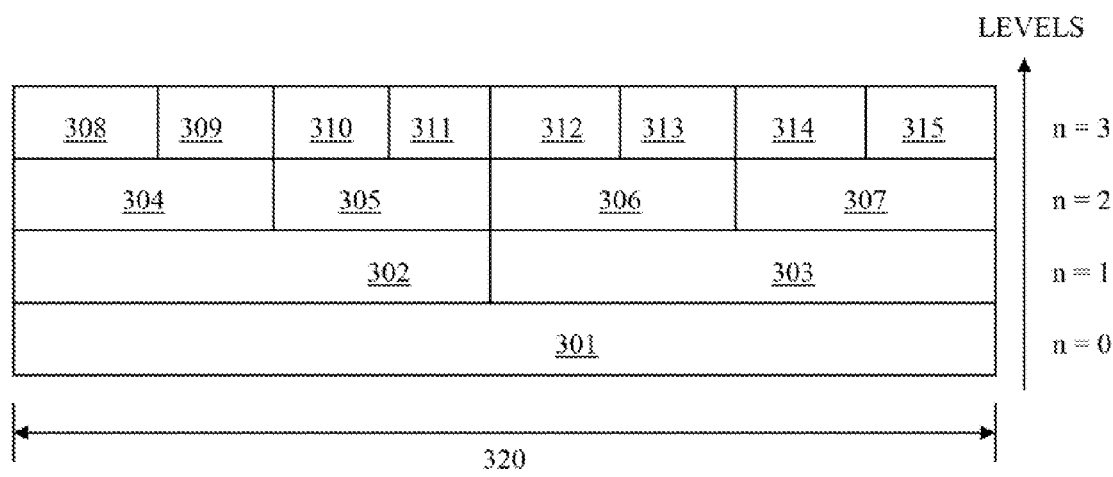
FIG. 3 is a block diagram of an exemplary sub-band division scheme employed by the communication system of FIG. 1 in dividing a frequency bandwidth into one or more sub-bands in accordance with an embodiment of the present invention.

When selectively scheduling the multiple UEs 102, 104 to use the frequency bandwidth during a scheduling period, communication system 100 may divide the frequency bandwidth into one or more sub-bands at each level. It may be noted that the number of carriers in each sub-band varies from level to level. For example, FIG. 3 is a block diagram 300 of an exemplary sub-band division scheme employed by communication system 100 in dividing a frequency bandwidth 320 into one or more sub-bands in accordance with an embodiment of the present invention. As depicted in block diagram 300, communication system 100 may divide frequency bandwidth 320 into one, two, four, or eight sub-bands during a scheduling period. Each such division of frequency bandwidth 320 comprises a different representation of the same frequency bandwidth and may be thought of as a different level of division of the frequency bandwidth. As a result, the division of frequency bandwidth 302 into a number of sub-bands may then be thought of as, and represented by, a hierarchical structure, wherein each increasing level (n) of the hierarchical structure corresponds to a dividing of the frequency bandwidth into a greater number of sub-bands. For example, as depicted in block diagram 300, at a first level (n=0) of the hierarchical structure, frequency bandwidth 320 is not subdivided, that is, frequency bandwidth 320 comprises only a single sub-band 301. At a second level (n=1) of the hierarchical structure, frequency bandwidth 320 is subdivided into two sub-bands 302 and 303. At a third level (n=2) of the hierarchical structure, frequency bandwidth 320 is subdivided into four sub-bands 304-307. And at a fourth level (n=3) of the hierarchical structure, frequency bandwidth 320 is subdivided into eight sub-bands 308-315.

Figure 4:
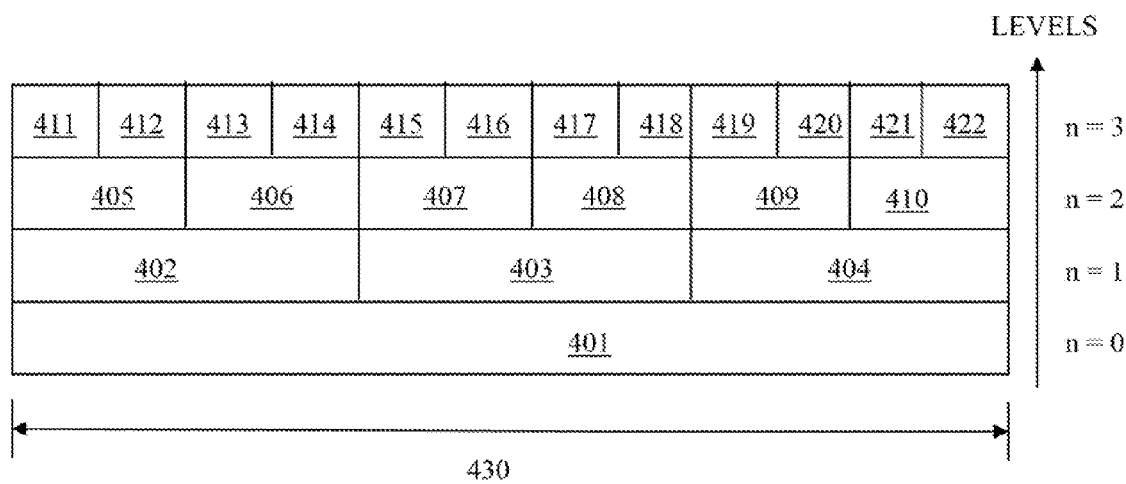
FIG. 4 is a block diagram of another exemplary sub-band division scheme employed by the communication system of FIG. 1 in dividing a frequency bandwidth into one or more sub-bands in accordance with another embodiment of the present invention.

In other words, with respect to the frequency bandwidth depicted in FIG. 3, for any given scheduling period, communication system 100 may divide frequency bandwidth 320 into one, two, four, or eight sub-bands, each of which divisions corresponds to a level (n=0, 1, 2, or 3) of the hierarchical structure. That is, at each level of the hierarchical structure (n=0, 1, 2, or 3), frequency bandwidth 320 is divided into '$2^n$' sub-bands. A value 'N' corresponds to the value associated with the top level of the hierarchical structure, that is, at the top level, 'n=N,' (that is, N=3 in FIG. 3) and the number of different levels of sub-band divisions is then equal to 'N+1' (for example, in FIG. 3, the number of different levels of sub-band divisions is equal to N+1, or 4). However, one of ordinary skill in the art realizes that a number of possible sub-bands per level, and a number of levels of bandwidth divisions, may vary with the frequency bandwidth employed and is further up to a designer of the system, and that the value of 'N' may vary correspondingly. For example, FIG. 4 is a block diagram 400 illustrating an exemplary hierarchical structure of a sub-band division scheme that may be employed by communication system 100 in dividing a frequency bandwidth 430 in accordance with another frequency bandwidth division scheme. While FIG. 4 again depicts four levels of bandwidth division, the number of sub-bands per level differs from FIG. 3, that is, at level n=0, frequency bandwidth 430 comprises one sub-band 401, at level n=1, frequency bandwidth 430 comprises three sub-bands 402-404, at level n=2, frequency bandwidth 430 comprises six sub-bands 405-410, and at level n=3, frequency bandwidth 430 comprises twelve sub-bands 411-422 during a scheduling period.

In order to selectively schedule the multiple UEs 102, 104 to use a frequency bandwidth employed by communication system 100, such as frequency bandwidths 320 or 430, a UE, such as UE 102, reports information concerning sub-band quality to RAN 120. In the prior art, a UE provides complete channel quality information for all of the top level sub-bands, such as sub-bands 308-315 with respect to frequency bandwidth 320 or sub-bands 411-422 with respect to frequency bandwidth 430, in each CQI message. However, such reporting may consume a significant amount of overhead when there are a large number of sub-bands. In order to conserve system capacity, communication system 100 merely requires that UE 102 provide information concerning the channel quality of a single sub-band, for example, the sub-band with the best channel quality, rather that providing a channel quality for all sub-bands, during a measuring and reporting period.

Figure 5:
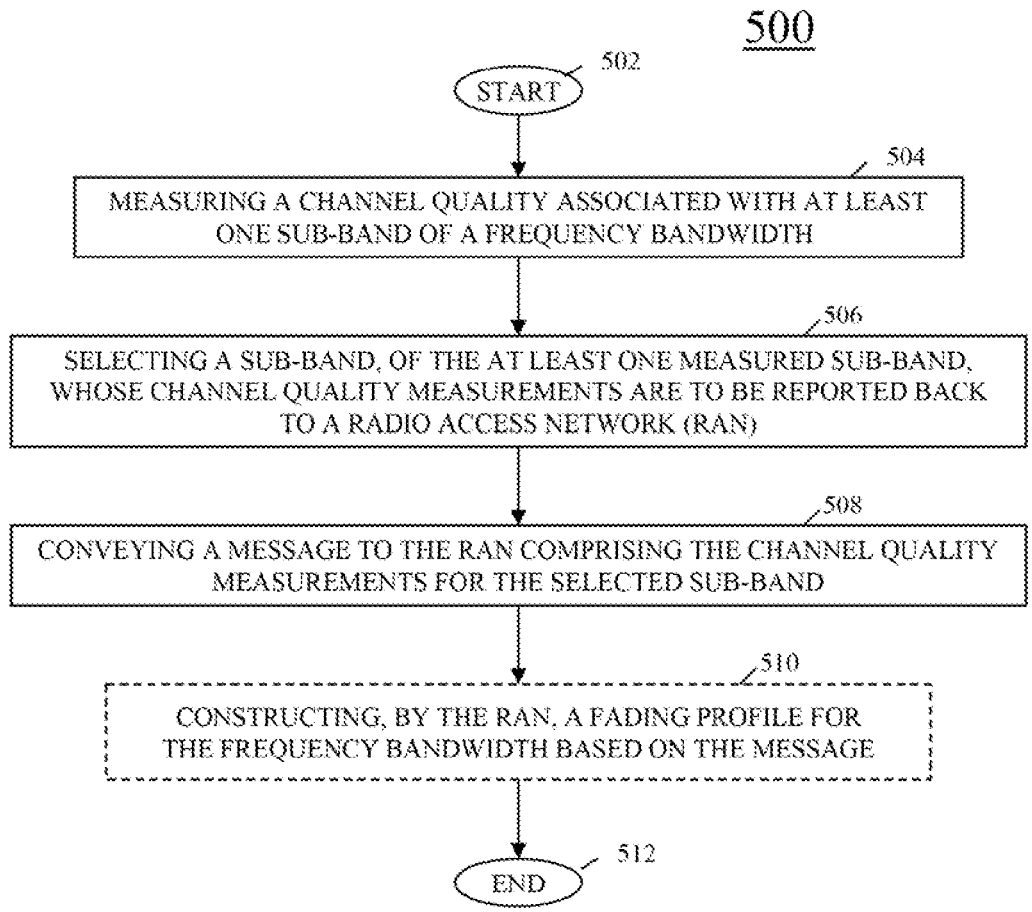
FIG. 5, a logic flow diagram of a method for a reporting of information concerning sub-band channel quality by a user equipment of FIG. 1 to a serving radio access network of FIG. 1 in accordance with an embodiment of the present invention.

Referring now to FIG. 5, a logic flow diagram 500 is provided that depicts a reporting of information concerning sub-band channel quality by a UE, such as UE 102, to a serving RAN, that is, RAN 120, in accordance with an embodiment of the present invention. Logic flow 500 begins (502) when UE 102 measures (504) a channel quality, preferably measuring Channel Quality Information (CQI) as is known in the art, associated with at least one sub-band of a frequency bandwidth employed by communication system 100. For example, UE 102 may measure a received signal power, a signal-to-noise ratio, a carrier-to-interference ratio, or a carrier power-to-noise power ratio associated with a signal transmitted over a channel utilizing the sub-band, or may measure a bit error rate or a frame error rate associated with such a signal. One of ordinary skill in the art realizes that many parameters may be measured in determining channel quality and that any such parameter may be used herein without departing from the spirit and scope of the present invention.

In one embodiment of the present invention, RAN 120 may inform UE 102 of the sub-bands to be measured during a measuring time period. For example, RAN 120 may provide UE 102 with a list of frequencies to monitor during each of one or more measuring periods, or the RAN may provide the UE with an identifier, such as an index number, of each sub-band to be measured during each of one or more measuring periods and, based upon the identifier, the UE is able to determine the frequencies to monitor during each measuring period.

In another embodiment of the present invention, UE 102 may be pre-programmed with information concerning which sub-bands to monitor during a measuring period, which information is also stored at RAN 120, for example, in the at least one memory device 126, 132, of transceiver 122 or controller 128. For example, UE 102 may be pre-programmed to cycle through the sub-bands of the frequency bandwidth during successive measuring periods. For example, and with reference to FIG. 3, UE 102 may be programmed to cycle its way through the multiple sub-bands 301-315, one sub-band at a time. That is, UE may measure a channel quality associated with only a first sub-band, such as sub-band 301, during a first measuring period. UE 102 may then measure a channel quality associated with a successive sub-band during each successive measuring period, such as a channel quality associated with sub-band 302 during a second measuring period and a channel quality associated with sub-band 303 during a third measuring period, working its way through all of the sub-bands and re-measuring a channel quality associated with the first measured sub-band 301 after measuring all of the other sub-bands.

By way of another example, and again with reference to FIG. 3, UE 102 may be programmed to cycle its way through the levels (n=0, 1, 2, 3), one level at a time. That is, UE 102 may be programmed to measure a channel quality associated with the sub-bands of level '0,' that is, sub-band 301, during a first measuring period. UE 102 may then measure a channel quality associated with the sub-bands of a next level during each successive measuring period, such as a channel quality associated with each of the sub-bands of level '1,' that is, sub-bands 302 and 303, during a second measuring period to produce a first multiple measured channel qualities, a channel quality associated with the sub-bands of level '2,' that is, sub-bands 304-307, during a third measuring period to produce a second multiple measured channel qualities, and a channel quality associated with the sub-bands of level '3,' that is, sub-bands 308-315, during a fourth measuring period to produce a third multiple measured channel qualities. After UE 102 measures a channel quality associated with the sub-bands of a top level, such as level '3' with respect to FIG. 3, UE 102 returns to measuring a channel quality associated with the sub-bands of the bottom level, that is, level '0.'

In still other embodiments of the present invention, UE 102 may measure all of the sub-bands during each measuring period or may measure a channel quality associated with each sub-band of a given level and channel qualities associated with selected sub-bands of other levels, such as a sub-band of another level whose channel quality was reported in a previous channel quality message, as is described in greater detail below.

In response to measuring the channel quality associated with at least one sub-band of a frequency bandwidth, UE 102 selects (506) a sub-band, of the at least one measured sub-band, whose channel quality information is to be reported back to RAN 120 in a channel quality message. When, at step 506, UE 102 selects a sub-band from among multiple sub-bands whose channel quality is measured during a measuring period, UE 102 preferably compares the measured channel qualities to produce a comparison and, based on the comparison, selects a sub-band associated with a best measured channel quality. However, in other embodiments of the present invention, UE 102 may, based on the comparison of measured channel qualities, report back channel quality information associated with a sub-band that has a middle channel quality of the measured channel qualities or that has a worst channel quality. Multiple algorithms will occur to one of ordinary skill in the art to be used to determine which sub-band, of the at least one measured sub-band, whose channel quality information is to be reported back to RAN 120, and any such algorithm may be used herein without departing from the spirit and scope of the present invention. However, the sub-band channel quality information reported back to RAN 120 should be such that the RAN is able to construct, over time, a fading profile for the frequency bandwidth associated with the sub-bands.

For example, in one embodiment of the invention, UE 102 may report channel quality information for the sub-bands on a sub-band-by-sub-band basis. That is, during each successive reporting period, UE 102 may report channel quality information associated with a successive sub-band. For example, and with reference to FIG. 3, UE 102 may work its way through the sub-bands 301-315, one sub-band at a time. That is, UE may report a channel quality associated with a first sub-band, that is, sub-band 301, during a first reporting period, may report a channel quality associated with a next sub-band, that is, sub-band 302, during a second reporting period, and so on. After reporting a channel quality associated with a last sub-band, that is, sub-band 315, UE 102 returns to the first sub-band, that is, sub-band 301, and reports a newly measured channel quality associated with the first sub-band during a next reporting period.

In another embodiment of the invention, UE 102 may report channel quality information for the sub-bands on a level-by-level basis. That is, during each successive reporting period, UE 102 selects a next, preferably successive, level and reports channel quality information associated with a sub-band of the selected next level. For example, and with reference to FIG. 3, UE 102 may work its way progressively through levels '0' through '3,' one level at a time. That is, UE may report a channel quality associated with a sub-band of a first level, that is, level '0' and sub-band 301, during a first reporting period. During a second reporting period, UE 102 may report a channel quality associated with a sub-band of a next, second level, that is, level '1' and sub-bands 302-303. During a third reporting period, UE 102 may report a channel quality associated with a sub-band of a next, third level, that is, level '2' and sub-bands 304-307. And during a fourth reporting period, UE 102 may report a channel quality associated with a sub-band of a next, fourth level, that is, level '3' and sub-bands 308-315. After reporting a channel quality associated with a top level, that is, level '3,' UE 102 returns to the first level, that is, level '0' and sub-band 301, and reports a newly measured channel quality associated with a sub-band of the first level.

In response to selecting a sub-band whose channel quality measurements are to be reported back to RAN 120 during the reporting period, UE 102 assembles, and conveys (508) to the RAN, during the reporting period, a message informing of a channel quality, preferably comprising Channel Quality Information (CQI), associated with the selected sub-band.

Figure 6:
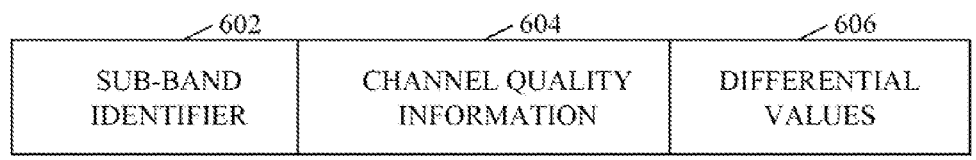
FIG. 6 is a block diagram of an exemplary channel quality message in accordance with various embodiments of the present invention.

Preferably, UE 102 includes in the message an identifier of the selected sub-band along with the associated channel quality information. For example, FIG. 6 is a block diagram of an exemplary channel quality message 600 in accordance with various embodiments of the present invention. Channel quality message 600 includes a first data field 602 that comprises an identifier of the sub-band selected at step 506, such as an index to one of sub-bands 301-315. Channel quality message 600 further includes a second data field 604 that comprises channel quality information, such as channel quality measurements, associated with the selected sub-band.

Channel quality message 600 may further include a third data field 606 that comprises an update of channel quality information associated with at least one previously reported sub-band. For example, suppose that a first data field 602 and a second data field 604 of a current channel quality message comprise an identifier and a channel quality associated with a sub-band of level 'n' (with respect to block diagram 300, n=0, 1, 2, or 3). Further suppose that, in each successive channel quality message, UE is reporting back a channel quality of a sub-band associated with a level 'n' that is one level higher than the level 'n−1' of the sub-band reported in the preceding channel quality message (note that, when the levels are being cycled through in successive channel quality messages, after a channel quality of a sub-band of level n=3 is reported in a channel quality message, the next channel quality message reports a channel quality of a sub-band of level n=0). In such an instance, third data field 606 may comprise channel quality information associated with the sub-band of level 'n−1' whose channel quality information was reported in the preceding channel quality message.

In order to minimize a size of the channel quality message, the channel quality information included in third data field 606 may comprise a differential value indicating a change in the channel quality of the level, or the sub-band that was selected for reporting, whose channel quality information was reported in an immediately preceding channel quality message. Thus RAN 120 knows the level and/or sub-band associated with the channel quality information reported in third data field 606 without the level or sub-band being expressly identified in the message. For example, if the channel quality information reported for a selected sub-band in a preceding channel quality message comprises a voltage associated with a measured channel quality, third data field 606 may comprise a value associated with a change in such a voltage, such a binary value corresponding to a change in decibels (dBs), resulting from a re-measuring of the sub-band's channel quality during the most recent measuring period.

Figure 7:
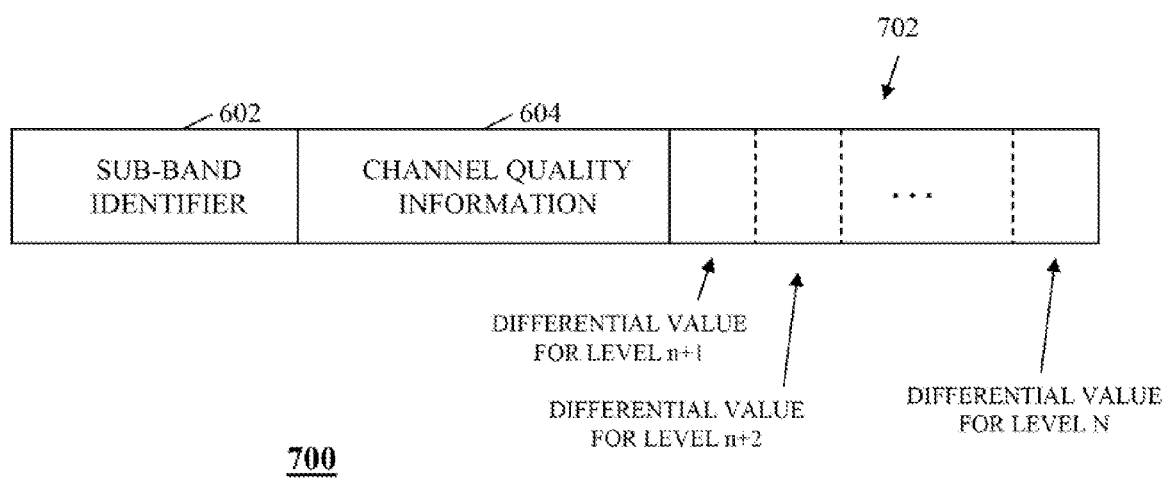
FIG. 7 is a block diagram of an exemplary channel quality message in accordance with another embodiment of the present invention.

By way of another example and referring now to FIG. 7, a block diagram is depicted of an exemplary channel quality message that comprises updates of channel quality information for multiple sub-bands other than the selected sub-band. Similar to channel quality message 600, channel quality message 700 includes a first data field 602 that comprises an identifier of the sub-band selected at step 506 and a second data field 604 that comprises channel quality information, such as channel quality measurements, associated with the selected sub-band. Channel quality message 700 further comprises a third data field 702 that includes channel quality information associated with sub-bands of each of multiple levels different from the level of the sub-band being currently reported in data fields 602 and 604. For example, suppose the first and second data fields 602, 604 comprise an identifier and a channel quality associated with a sub-band of level 'n.' Third data field 702 may then comprise multiple data sub-fields, wherein each sub-field reports a channel quality of a sub-band of a level other than level 'n' and which sub-band also is of a level different from the levels of the sub-bands reported in the other sub-fields. The sub-fields may report sub-band channel quality information in a predetermined order, such as a first sub-field reporting channel quality information for level 'n+1' (and possibly of the sub-band that was the best previous reported sub-band for that level), a second sub-field reporting channel quality information for level 'n+2' (and, again, possibly of the sub-band that was the best previous reported sub-band for that level), and so on, so that the RAN knows the level and/or sub-band associated with the channel quality information reported in each sub-field without the level or sub-band being expressly identified in the message. Again, in order to minimize a size of the channel quality message, the channel quality information included in each sub-field of third data field 702 may comprise a single bit associated with a differential value, which differential value identifies a change in the channel quality value reported for a sub-band or a level associated with the sub-field from a value that was reported for the sub-band or level in a preceding channel quality message.

When the sub-band being measured comprises the entire frequency bandwidth, such as sub-band 301 with respect to bandwidth 320 or sub-band 401 with respect to bandwidth 430, then the channel quality information reported by the UE may comprise a channel quality value averaged over the entire bandwidth. For example, typically channel quality measurements are made for channels that are significantly narrower than the entire frequency bandwidth. When the frequency bandwidth comprises multiple sub-bands that are each sufficiently narrow, a channel quality measurement may cover all or nearly all of the sub-band. However, when the frequency bandwidth comprises one or more sub-bands that are particularly wide, such as a single sub-band, such as sub-bands 301 and 401, that covers nearly the entire frequency bandwidth, then each sub-band may be associated with multiple channels that are measured during a measuring period. In such an event, UE 102 may average the channel quality measurements made for the multiple channels during a measuring period to produce an average channel quality measurement and the channel quality information reported by the UE for the sub-band may comprise an average channel quality value.

In response to receiving the channel quality message, RAN 120 may construct (510) a fading profile for the frequency bandwidth, such as frequency bandwidths 320 or 430, and logic flow 500 then ends (512). For example, FIG. 8 comprises graphical representations of a construction of a fading profile for a frequency bandwidth, and in particular frequency bandwidth 430, based on level-per-level channel quality information provided in channel quality messages as described herein.

Figure 8:
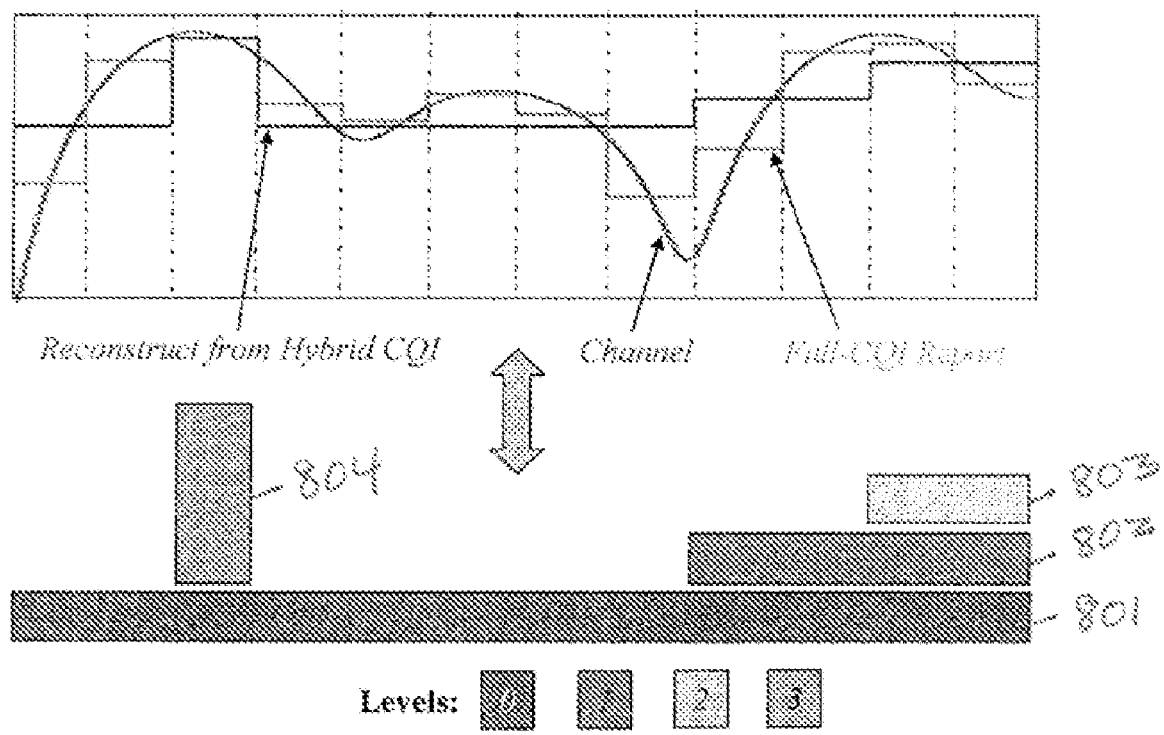
FIG. 8 are graphical representations of an exemplary construction of a fading profile for a frequency bandwidth based on level-per-level channel quality information in accordance with an embodiment of the present invention.

The fading profile for frequency bandwidth 430 that is depicted in FIG. 8 may be constructed as follows. A first channel quality message provides channel quality information for level '0,' that is, sub-band 401. The channel quality information for sub-band 401 is used to generate bar 801. Another, second channel quality message provides channel quality information for level '1,' that is, sub-bands 402-404. The channel quality information included in the second message indicates that sub-band 404 has a best channel quality of the sub-bands included in level '1.' This channel quality information, indicating sub-band 404 has a best channel quality of the sub-bands included in level '1,' is used to generate bar 802. Yet another, third channel quality message provides channel quality information for level '2,' that is, sub-bands 405-410. The channel quality information included in the third message indicates that sub-band 410 has a best channel quality of the sub-bands included in level '2.' This channel quality information, indicating sub-band 410 has a best channel quality of the sub-bands included in level '2,' is used to generate bar 803. Still another, fourth channel quality message provides channel quality information for level '3,' that is, sub-bands 411-422. The channel quality information included in the fourth message indicates that sub-band 413 has a best channel quality of the sub-bands included in level '3.' This channel quality information, indicating sub-band 413 has a best channel quality of the sub-bands included in level '3,' is used to generate bar 804. Thus the bottom bar graph of FIG. 8 is generated, which bar graph provides a profile of the channel qualities of all of the sub-bands 401-422 of frequency bandwidth 430. Based on the bar graph, one of ordinary skill in the art may generate the top graph of FIG. 8, which comprises a fading profile of the entire bandwidth 430.

Thus by exchanging channel quality messages that each comprises channel quality information associated with a single sub-band, such as single sub-band of a sub-band level, a fading profile of an entire frequency bandwidth may be constructed. In this manner, communication system 100 consumes less overhead in the provision of channel quality feedback than OFDM systems of the prior art, which prior art systems exchange CQI messages that include CQI for every sub-band of a frequency bandwidth. Further, the channel quality messages fed back by communication system 100 may further include updates of channel quality information provided in previous channel quality messages. As these are updates of previously provided information, such as a sub-band whose channel quality information was provided in an immediately preceding channel quality message, a receiving RAN is able to determine the sub-band associated with the update without the sub-band being expressly identified in the message. By not expressly identifying the sub-band in the message, message size may be reduced and system overhead conserved. Further, by including updates, such as differential information, rather than complete CQI, system overhead is further conserved.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel quality feedback in an Orthogonal Frequency Division Multiplexing communication system, wherein a frequency bandwidth is represented by a plurality of sub-band levels, wherein each sub-band level comprises a division of the frequency bandwidth into a number of sub-bands different from the number of sub-bands of the other sub-band levels, and wherein the method comprises:

selecting a sub-band of a first sub-band level of the plurality of sub-band levels based on a predefined list of sub-bands to monitor;

measuring a channel quality associated with one or more sub-bands of a second sub-band level of the plurality of sub-band levels, wherein the selected sub-band of the first sub-band level is divided into a plurality of sub-bands to produce the sub-bands of the second sub-band level;

selecting a sub-band of the one or more sub-bands of the second sub-band level; and reporting a channel quality information message for at least the selected sub-band of the second sub-band level to a radio access network, wherein the channel quality information message comprises channel quality information for each reported sub-band and an identifier of the selected sub-band of the second sub-band level.

2. The method of claim 1, wherein the first sub-band level comprises a single sub-band.

3. A user equipment configured to report a channel quality in an Orthogonal Frequency Division Multiplexing communication system, wherein a frequency bandwidth is represented by a plurality of sub-band levels, wherein each sub-band level comprises a division of the frequency bandwidth into a number of sub-bands different from the number of sub-bands of the other sub-band levels and wherein the user equipment comprises:

a processor configured to select a sub-band of the first sub-band level based on a predefined list of sub-bands to monitor;

said processor to measure a channel quality associated with one or more sub-bands of a second sub-band level of the plurality of sub-band levels, wherein the selected sub-band of the first sub-band level is divided into a plurality of sub-bands to produce the sub-bands of the second sub-band level;

said processor to select a sub-band of the one or more measured sub-bands of the second sub-band level; and said processor to report a channel quality information message associated with at least the selected sub-band of the second sub-band level to a radio access network, wherein the channel quality information message comprises channel quality information for each reported sub-band and an identifier of the selected sub-band of the second sub-band level.

4. The user equipment of claim 3, wherein the first sub-band level comprises a single sub-band.

* * * * *